350-96.14 SR
1/28/86 XR 4,567,569

United States Patent [19]

Caulfield et al.

[11] Patent Number: 4,567,569

[45] Date of Patent: Jan. 28, 1986

[54] OPTICAL SYSTOLIC ARRAY PROCESSING

[75] Inventors: Henry J. Caulfield, Huntsville, Ala.; William T. Rhodes, Atlanta, Ga.

[73] Assignee: Battelle Development Corporation, Columbus, Ohio

[21] Appl. No.: 450,153

[22] Filed: Dec. 15, 1982

[51] Int. Cl.[4] .......................... G06G 9/00; G06G 7/16; G02B 6/10

[52] U.S. Cl. .......................... 364/845; 364/841; 350/96.14

[58] Field of Search .............. 364/800, 807, 841, 845; 350/162.11, 162.12, 400–406, 96.14

[56] References Cited

U.S. PATENT DOCUMENTS

| | | | |
|---|---|---|---|
| 3,305,669 | 2/1967 | Fan | 364/845 X |
| 4,094,581 | 6/1978 | Baldwin et al. | 350/406 X |
| 4,156,284 | 5/1979 | Engeler | 364/841 X |
| 4,403,833 | 9/1983 | Kenan et al. | 350/96.14 X |
| 4,468,093 | 8/1984 | Brown | 350/162.12 |

OTHER PUBLICATIONS

Kung et al., "Algorithms for VLSI Processor Arrays", *Introduction to VLSI Systems*, Addison-Wesley, Reading, Mass. 1980, pp. 271-292.

Caulfield et al., "Eigenvector Determination by Noncoherent Optical Methods", *Applied Optics*, vol. 20, No. 13, 1 Jul. 1981, pp. 2263-2265.

Goodman et al., "Fully Parallel, High-Speed Incoherent Optical Method for Performing Discrete Fourier Transforms", *Optics Letters*, vol. 2, No. 1, Jan. 1978, pp. 1-3.

H. J. Caulfield et al., "Optical Implementation of Systolic Array Processing", *Optics Communications*, vol. 40, No. 2, pp. 86-90, 15 Dec. 1981.

*Primary Examiner*—Gary V. Harkcom
*Attorney, Agent, or Firm*—Philip M. Dunson

[57] ABSTRACT

Provided are a series of analog quantities that are approximately proportional respectively to the components of a third array that is the product of a first array of components multiplied by a second array of components in a predetermined order. Light of intensity approximately proportional to the first component of the first array is directed to the input side of a modulator whose output light intensity is approximately proportional to an electrical signal applied to it. Applied to the modulator, while the light is passing through it, is a signal approximately proportional to the first component of the second array, so that the intensity of the output light from the modulator is approximately proportional to the product of the two first components. The output light from the modulator is directed to a detector for providing an electrical signal that is approximately proportional to the product of the two first components. After predetermined times, the above steps are repeated with the second then the third, etc., and finally with the last component of the first array and the last component of the second array to provide a similar electrical signal each time; and the individual product signals are directed to summers, so that each provides an output that is approximately proportional to a component of the third array.

12 Claims, 8 Drawing Figures

OPTICAL SYSTOLIC ARRAY PROCESSING

FIELD

This invention relates to systolic array processing with optical methods and apparatus. It is especially useful for computations involving multiplication of a vector by a matrix and for computations involving multiplication of a matrix by a matrix.

BACKGROUND

The following disclosures includes the paper by H. J. Caulfield, W. T. Rhodes, M. J. Foster, and Sam Horvitz, *Optical Implementation of Systolic Array Processing,* Optics Communications, 40, 86–90, Dec. 15, 1981, wherein it is shown how certain algorithms for matrix-vector multiplication can be implemented using acoustooptic cells for multiplication and input data transfer and using CCD (charge coupled device) detector arrays for accumulation and output of the results. No 2-D matrix mask is required; matrix changes are implemented electronically. A system for multiplying a 50-component nonnegative-real matrix is described. Modifications for bipolar-real and complex-valued processing are possible, as are extensions to matrix-matrix multiplication and multiplication of a vector by multiple matrices.

During the past several years, Kung and Leiserson at Carnegie-Mellon University [1,2] have developed a new type of computational architecture which they call "systolic array processing". Although there are numerous architectures for systolic array processing, a general feature is a flow of data through similar or identical arithmetic or logic units where fixed operations, such as multiplication and addition, are performed. The data tend to flow in a pulsating manner, hence the name "systolic". Systolic array processors appear to offer certain design and speed advantageous for VLSI (very large scale integration) implementation over previous calculational algorithms for such operations as matrix-vector multiplication, matrix-matrix multiplication, pattern recognition in context, and digital filtering. This paper grew out of our desire to explore the possibility of improving systolic array processors by using optical input and output as well as our desire to explore new architectures for optical signal processing. We will concentrate on describing the particular case of matrix-vector multiplication, but note that many other operations can be performed in an analogous manner.

In systolic multiplication of a vector by a matrix the problem we address is that of evaluating a vector $\vec{y}$ given by $$\vec{y}=Ax, \quad (1)$$

where A is an n by n matrix, and $\vec{x}$ and $\vec{y}$ are n-component vectors. We assume that A has a bandwidth w, i.e., all of its non-zero entries are clustered in a band of width w around the major diagonal. Such matrices arise frequently in the solution of boundary value problems for ordinary differential equations. A systolic array that solves this problem is introduced by Kung and Leiserson [1,2] and will be reviewed briefly here.

DISCLOSURE

Methods and apparatus according to the present invention for providing a series of analog quantities that are approximately proportional respectively to the components of a third array that is the product of a first array of components multiplied by a second array of components in a predetermined order typically comprise the steps of, and means for, directing light of intensity proportional to the first component of the first array to the input side of modulating means whose output light intensity is proportional to a known function of an electrical signal applied to it;

applying to the modulating means, while the light is passing through it, a signal proportional to a function of the first component of the second array such that the intensity of the output light from the modulating means is proportional to a known function of the product of the two first components;

then, after predetermined times, repeating the above steps with the second then the third, etc., and finally with the last component of the first array and the last component of the second array to provide a similar electrical signal each time; and providing a series of output signals responsive to the sums of predetermined groups of output light intensitities and proportional respectively to the components of the third array.

Typically the output signals providing steps comprises providing an electrical signal proportional to a known function of the intensity of each output light, and combining additively the electrical signals for each predetermined group of output light intentities.

DRAWINGS

FIGS, 1, 2, and 3 are schematic diagrams illustrating systolic multiplication of a vector $\vec{x}$ by a banded matrix A. The traditional representation of this operation is shown in FIG. 1. The basic cell for this operation is shown in FIG. 2. The flow of $\vec{x}$, $\vec{y}$, and A data is shown in FIG. 3.

CARRYING OUT THE INVENTION

Figure 1:
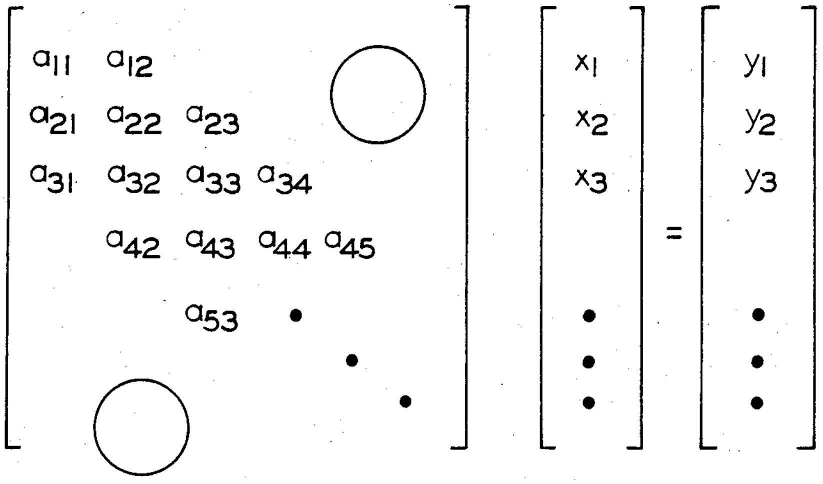
Figure 2:
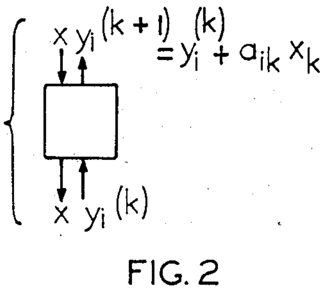
Figure 3:
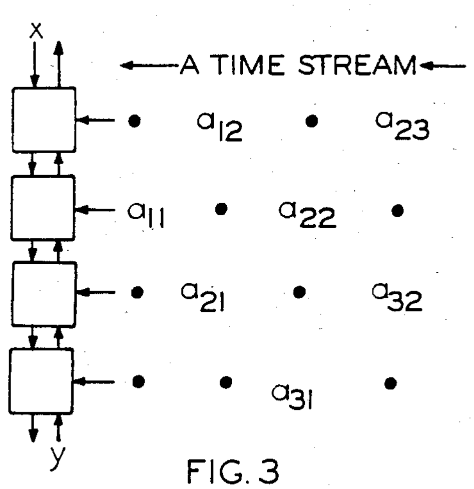

A systolic array for multiplying a matrix of bandwidth w by a vector of arbitrary length has inner-product cells. The array for bandwidth 4 is shown in FIG. 3. Each of the four heavy boxes represents an inner-product cell, capable of updating the vector component $Y_i$ according to the replacement $$y_i \leftarrow y_i + a_{ij}x_j. \quad (2)$$

The cells act together at discrete time intervals, or beats, with half of the cells active on each beat. The elements of the matrix A are input from the right, and the vector $\vec{x}$ is input from the top. Zeroes are input from the bottom and accumulate terms of the vector $\vec{y}$ as they move upward.

Figure 4:
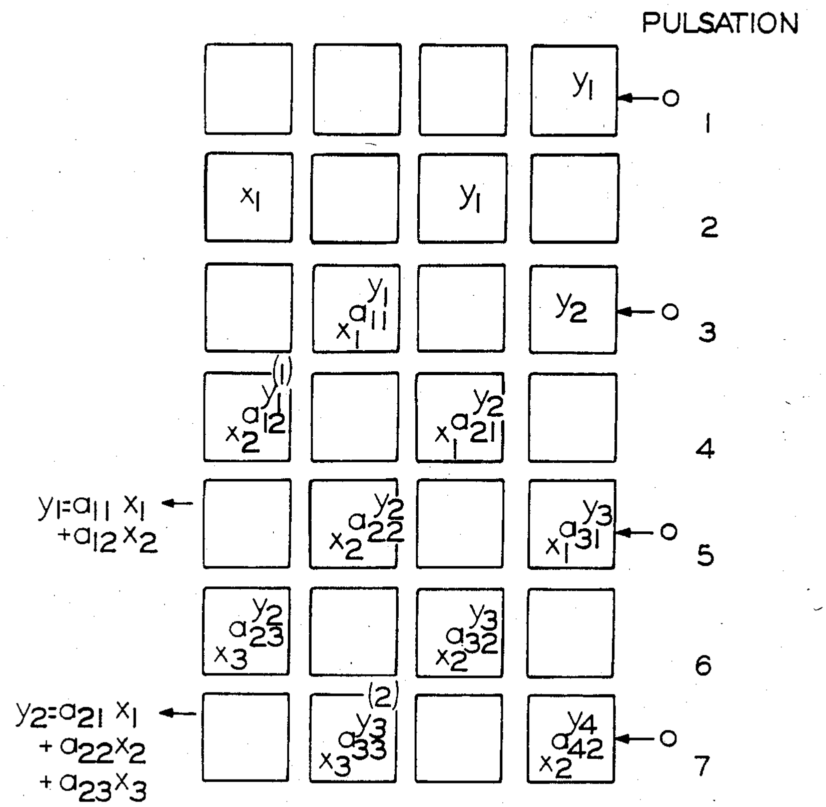
FIG. 4 is a block diagram showing the first seven pulsations of the processor of FIG. 3.

FIG. 4 traces the action of the array for several beats, or pulsations showing the terms of A and $\vec{x}$ and the partial terms of $\vec{y}$ that are in each cell on each pulsation.

Thus on pulsation 1, $y_1=0$ is entered. In pulsation 2, $x_1$ is entered. In pulsation 3, $y_1$ becomes $a_{11}x_1$. In pulsation 4, $y_1$ becomes $a_{11}x_1+a_{12}x_2$. In pulsation 5, $y_1$ exits. Every other pulse another $y_j$ exits and on that same pulse another $Y_k$ is inserted (at an initial value of zero).

Optical systolic array processing can include key features of the systolic array approach to matrix-vector multiplication such as (1) a regular, directed flow of data streams, (2) multiplication, and (3) addition or accumulation. These features are also characteristic of many optical signal processing systems, and it should come as no great surprise that optical implementations of systolic architectures are possible. Since both bulk and surface acoustic waves are routinely used in optical signal processing to produce a moving stream of data and for multiplication of data, it seems natural to use these components for optical systolic array processing.

We choose as our example the simple matrix-vector multiplication $$\begin{bmatrix} y_1 \\ y_2 \end{bmatrix} = \begin{bmatrix} a_{11} & a_{12} \\ a_{21} & a_{22} \end{bmatrix}, \quad (3)$$

assuming initially that all quantities in this equation are real and nonnegative. The basic concept is illustrated with the help of FIG. 5. The system shown consists of an acoustooptic modulator illuminated by the collimated light from three LEDs (light emitter diodes), a Schlieren imaging system, and three detectors connected to a CCD analog shift register. At the moment illustrated in the figure, modulating signals proportional to $x_1$ and $x_2$ have been input to the acoustooptic modulator driver, producing short grating segments in the acoustooptic cell. As the $x_1$ grating segment passes in front of LED 21 (the situation shown in the figure), that LED is pulsed in proportion to matrix coefficient $a_{11}$. The transmitted light, proportional in intensity to $a_{11}x_1$, is imaged onto CCD detector 20, which sends a proportional charge to an associated "bin" in the shift register.

The $x_1$ and $x_2$ grating segments now travel so as to be in front of LEDs 1L and 3L, respectively. At the same time, the accumulated CCD charge from detector 2D is shifted one bin, in the direction indicated by the arrow labeled "output" in the figure. LEDs 1L and 3L are now pulsed, in proportional to $a_{21}$ and $a_{12}$, respectively. Since these LEDs illuminate detectors 3D and 1D via grating segments $x_1$ and $x_2$, charge is generated by these detectors in proportion to $a_{21}x_1$ and $a_{12}x_2$, respectively, and accumulated in the corresponding shift register bins.

In the next increment of the system, charges are again shifted, with accumulated charge in proportion to $a_{11}x_1+a_{12}x_2$, or $Y_1$, being output. The charge packet now associated with detector 2D (already proportional to $a_{21}x_1$) is augmented by a final strobe of LED 2L by an amount proportional to $a_{22}x_2$. A final two shifts of the CCD charge packets bring charge proportional to $a_{21}x_1+a_{22}x_2$, or $Y_2$, to the output, and the operation is complete.

The system illustrated is easily expanded to accommodate matrix-vector operations of higher dimensionality. If $\vec{y}$ and $\vec{x}$ are N-component vectors A and N x N matrix, the maximum number of LEDs required is $2N-1$ (the number of diagonals of the matrix), and the number can be smaller if A has a smaller bandwidth.

Figure 5:
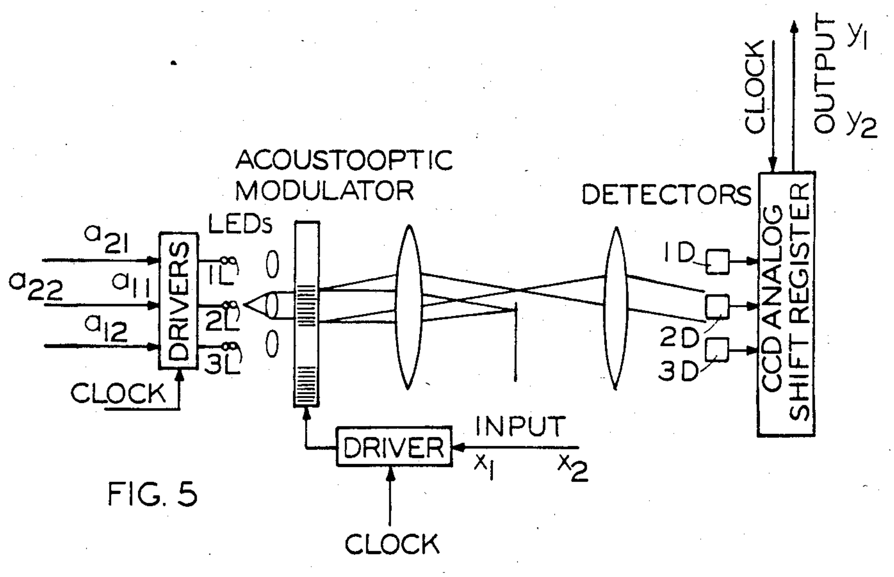
FIG. 5 is a schematic diagram showing typical optical implementation of the systolic array processor of FIG. 3.
Figure 6:
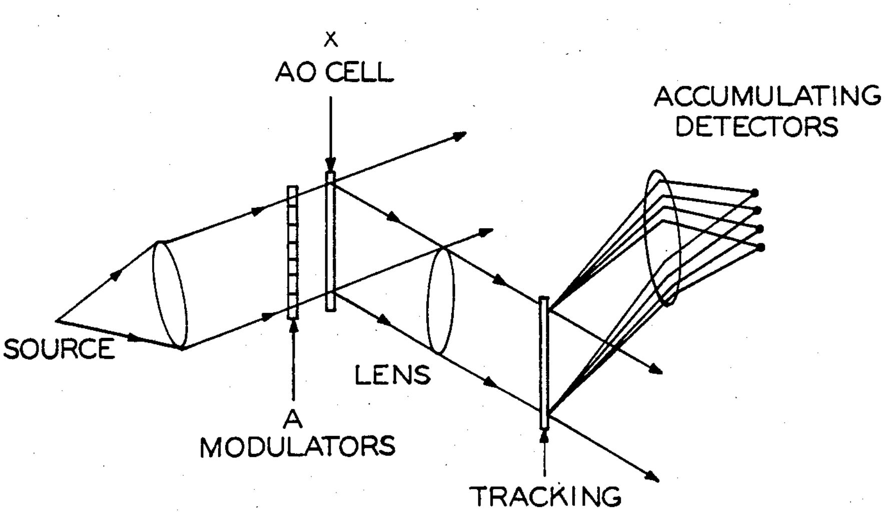
FIG. 6 is a schematic diagram showing another typical optical implementation of the processor of FIG. 3.

Numerous variations of the system of FIG. 5 are possible. FIG. 6, for example, shows the LEDs replaced by a single light source and an array of modulators. The CCD shift register has been replaced by stationary detectors and integrators combined with a second acoustooptic cell, which serves to deflect light to the correct detector/integrator. The acoustooptic deflector approach to sorting output data may facilitate greater system dynamic range than is achievable with CCD detector arrays.

Bipolar and complex-valued computations. It was assumed in the preceding discussion that all elements of the matrix and input vectors were nonnegative-real. In practice, most matrix-vector multiplication operations of importance involve bipolar-real or complex-valued vectors and matrices, and some means must be employed for handling them. If the elements are real valued, but not necessarily nonnegative, a two-component decomposition scheme described in ref. [3] can be employed. For complex-valued valued processing, several schemes have been described [4]. One of these involves a three-component decomposition of complex numbers according to ref. [5], $$z=z_0+z_1 \exp[i2\pi/3]+z_2 \exp[i4\pi/3], \quad (4)$$

where $z_0,z_1,z_2$ are nonnegative-real. Another involves biased real and imaginary components [6]. All such methods lead to some additional processor complexity and to a reduction in the size of the vectors and matrices that can be accommodated.

APPLICABILITY

Operating parameters of a typical system are of interest also. Matrix size limitations are imposed by the acoustooptic modulator. Consider a system using for input a bulk acoustooptic cell with a 100 MHz bandwidth and a 10 μtime window. We estimate that such a cell should accommodate 100 LED/lenslet combinations operating side by side, allowing multiplication of a 50-component nonnegative-real vector by a 50+50 nonnegative-real matrix. Achievable dynamic range depends on CCD detector dynamic range and on the correlation of LED and acoustooptic modulator nonlinearities; it is too speculative to suggest numbers at this time. Operating speed is determined by the amount of time it takes to shift the components of $\vec{x}$ through the acoustooptic cell, plus setup and final readout time. For the 10 μs window cell under consideration, it takes 5 μs to get the $x_1$ grating segment to the middle of the acoustooptic cell, at which time the first LED pulse occurs. The last LED pulse occurs 10 μs later, when $x_{50}$ finally passes the midpoint of the cell. Following that pulse, an additional 50 μs are required to read $Y_{50}$ out of the shift register. The time required for the $50\times50$ matrix-vector multiplication is thus 10 μs. During the processing interval, a total of 2500 multiplications are performed, at a rate of $2.5\times10^8$ multiplications per second. With suitable encoding of the data [3,4], this corresponds to a processing rate of $6.25\times10^7$ bipolar-real multiplications per second or $2.78\times10^7$ complex multiplications per second.

It must be emphasized that this example is illustrative but not optimum. Ultimate speeds, throughputs, and sizes cannot now be assumed. The system described does not exploit the two-dimensionality of the optical system. More than one matrix can multiply the same input vector at the same time if the single linear LED/lenslet and detector arrays are replaced with a collection of linear arrays, one above the other. Shear wave acoustooptic modulators, with nearly square window formats, can accommodate perhaps 20 such linear arrays, allowing 20 separate matrices to multiply the same input vector at the same time.

Figure 7:
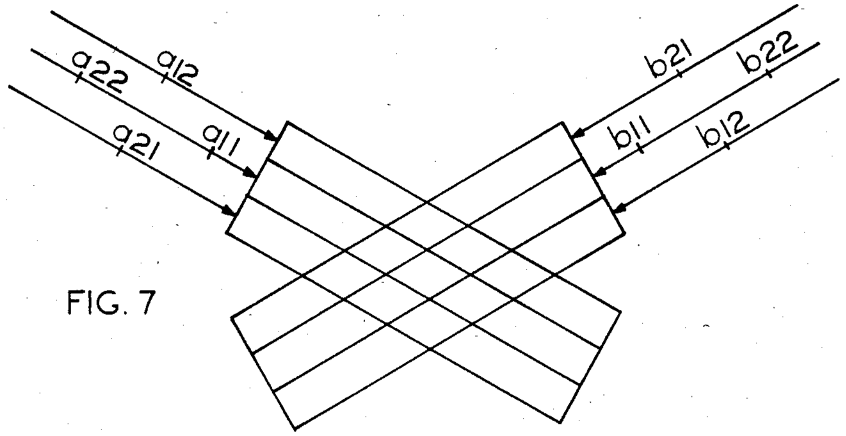
FIGS. 7 and 8 are schematic diagrams illustrating the use of crossed acoustooptic cells to produce A×B=C. The input information flow is shown in FIG. 7, and the calculated C values are produced as indicated in FIG. 8.
Figure 8:
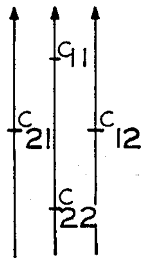

Matrix-matrix multiplication can be performed with related systems using multiple acoustooptic cells, or, alternatively, single cells with multiple driver/transducers. FIG. 7 shows one possible arrangement for multiplication of two 2×2 nonnegative-real matrices. In general for such a scheme, multiplication of two N×N matrices requires two multi-transducer acoustooptic modulators with 2N—1 transducers each. Alternatively, one such multitransducer cell could be used, illuminated by a 2-array of $N^3$-2 LEDs.

The following references are cited above. References [2]-[6] hereby incorporated by reference into this specification, for purposes of indicating the background of the present invention and illustrating the state of the art.

[1] H. T. Kung and C. E. Leiserson, Systolic array apparatuses for matrix computations, U.S. patent application, Filed Dec. 11, 1978; now U.S. Pat. No. 4,493,048, issued Jan. 8, 1985.

[2] H. T. Kung and C. E. Leiserson, in: Introduction to VLSI, eds. C. A. Mead and L. A. Conway (Addison-Wesley, Reading, Mass., 1980) pp. 271–292.

[3] H. J. Caulfield, D. Dvore, J. W. Goodman and W. T. Rhodes, Appl. Optics 20 (1981) 2263.

[4] A. R. Dias, Ph.D. Dissertation, Stanford University, 1980 (University Microfilm No. 8024641).

[5] J. W. Goodman, A. R. Diax and L. M. Woody, Optics Lett. 2 (1978) 1.

[6] J. W. Goodman, A. R. Dias, L. M. Woody and J. Erickson, in: Optica hoy y manana, Proc. ICO-11 Conf., Madrid, Spain, 1978, eds. J. Bescos, A. Hidalgo, L. Plaza and J. Santamaria, p. 139.

While the forms of the invention herein disclosed constitute presently preferred embodiments, many others are possible. It is not intended herein to mention all of the possible equivalent forms or ramifications of the invention. It is to be understood that the terms used herein are merely descriptive rather than limiting, and that various changes may be made without departing from the spirit or scope of the invention.

I claim:

1. A method for providing a series of analog quantities that are proportional respectively to the components of a third array that is the product of a first array of components multiplied by a second array of components in a predetermined order, comprising, directing light of intensity proportional to the first component of the first array to the light side of modulating means whose output light intensity is proportional to a known function of an electrical signal applied to it, applying to the modulating means, while the light is passing through it, a signal proportional to a function of the first component of the second array such that the intensity of the output light from the modulating means is proportional to a known function of the product of the two first components, then, after a predetermined time:

directing light of intensity proportional to the second component of the first array to the input side of modulating means whose output light intensity is proportional to a known function of an electrical signal applied to it, applying to the modulating means, while the light is passing through it, a signal proportional to a function of the second component of the second array such that the intensity of the output light from the modulating means is proportional to a known function of the product of the two second components, and so on, in the same manner, and finally with the last component of the first array and the last component of the second array to provide an electrical signal that is proportional to a known function of the product of the two last components, and providing a series of output signals responsive to the sums of predetermined groups of output light intensities and proportional respectively to the components of the third array.

2. A method as in claim 1, wherein the output signals providing step comprises providing an electrical signal proportional to a known function of the intensity of each output light, and combining additively the electrical signals for each predetermined group of output light intensities.

3. A method as in claim 1, wherein the light is directed to the modulating means from light emitter diode means.

4. A method as in claim 3, wherein the intensity of the light from each light emitter diode means is controlled by electrical signals proportional to a predetermined function of the components of the first array.

5. A method as in claim 4, wherein the electrical signals are applied to each light emitter diode means by driver means at predetermined times controlled by clock means.

6. A method as in claim 1, wherein each signal applied to the modulating means is an electrical signal that is applied by driver means at predetermined times controlled by clock means.

7. A method as in claim 1, wherein the modulating means comprises an acoustooptic modulator.

8. A method as in claim 1, wherein each output light is directed to charge coupled device means to provide electrical output signals, and predetermined groups of the electrical output signals are combined additively by analog shift register means at predetermined times controlled by clock means.

9. A method as in claim 1, wherein each output light is directed to accumulating detector means, one detector means for each predetermined group of output light intensities, to provide an electrical output responsive to each output light directed thereto and to combine additively the electrical outputs for each predetermined group.

10. A method as in claim 1, wherein the light is directed to the modulating means from a single source of light and a plurality of premodulating means.

11. A method as in claim 10, wherein the intensity of the light from each premodulating means is controlled by electrical signals proportional to a predetermined function of the components of the first array.

12. A method as in claim 11, wherein the first array comprises a matrix, the second array comprises a matrix, and the modulating means comprises a plurality of modulators.

* * * * *